(12) United States Patent
Fujimiya

(10) Patent No.: US 6,771,581 B2
(45) Date of Patent: Aug. 3, 2004

(54) DIGITAL MODULATION METHOD, DIGITAL DEMODULATION METHOD, AND PRERECORDED RECORDING MEDIUM

(75) Inventor: Kohji Fujimiya, Tokyo (JP)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 10/024,318

(22) Filed: Dec. 21, 2001

(65) Prior Publication Data

US 2002/0080706 A1 Jun. 27, 2002

(30) Foreign Application Priority Data

Dec. 22, 2000 (JP) ........................................ 2000-391353

(51) Int. Cl.$^7$ ................................................ G11B 7/00
(52) U.S. Cl. .................. 369/59.25; 369/59.1; 369/47.1; 369/47.35
(58) Field of Search ............................ 369/59.1, 59.12, 369/59.15, 59.19, 59.2, 59.21, 59.22, 59.23, 59.25, 47.1, 47.15, 47.19, 47.2, 47.21, 47.27, 47.28, 47.34, 47.35; 341/58, 48, 59; 275/253

(56) References Cited

U.S. PATENT DOCUMENTS 5,506,581 A * 4/1996 Ino et al. ....................... 341/58
5,673,243 A * 9/1997 Yanagi et al. ............. 369/59.24
6,359,930 B1 * 3/2002 Nakagawa et al. ......... 375/253

* cited by examiner

*Primary Examiner*—Muhammad Edun
(74) *Attorney, Agent, or Firm*—Oblon, Spivak, McClelland, Maier & Neustadt, P.C.

(57) ABSTRACT

In a digital modulation method, digital data is supplied to a conversion table, and the digital data is converted into serial data. The serial data is supplied to a first fixed contact of a selector and is switched to data for a sync pattern from a sync pattern table, the sync pattern being supplied to a second fixed contact. From the selector, 93-data serial data including the 2-data sync pattern at the head thereof is extracted. The serial data is supplied to an exclusive-OR circuit, and the exclusive-OR output is fed back through a delay circuit, thereby generating NRZI data to be recorded. A digital sum value (DSV) of the NRZI data varies in accordance with the selection of conversion tables. The DSV is arbitrarily controlled, and sub-information is inserted by performing the control in a predetermined format.

9 Claims, 21 Drawing Sheets

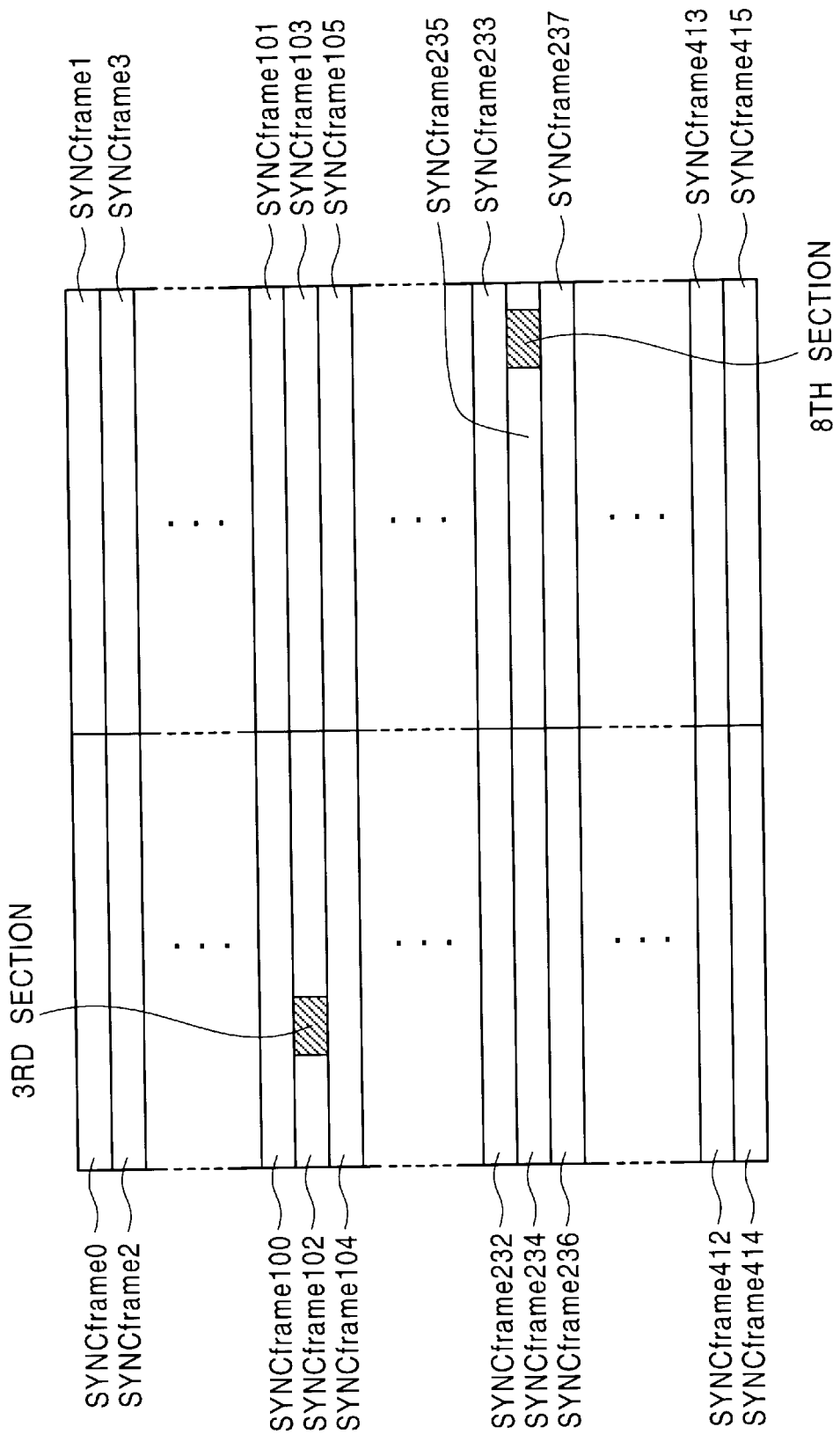

FIG. 12

TABLE 1

| SECTION NO. | DS0 | DS1 | DS2 | DS3 | DS4 | DS5 | DS6 | DS7 | DS8 | DS9 | NUMBER OF VALID DATA | MODULATION OF PRESENT INVENTION | | INSERTED SUB-INFORMATION | NORMAL MODULATION | | DETECTED SUB-INFORMATION |
|---|---|---|---|---|---|---|---|---|---|---|---|---|---|---|---|---|---|
| | | | | | | | | | | | | DSV4 | DSV9 | | DSV4 | DSV9 | |
| 0 | SYNC | 4 | 2 | 226 | 0 | 246 | 18 | 0 | 0 | 0 | 8 | -4 | -6 | 0 | -4 | 6 | 0 |
| 1 | 0 | 0 | 0 | 1 | 0 | 34 | 4 | 4 | 136 | 152 | 8 | -2 | 2 | 0 | -2 | -2 | -2 |
| 2 | 2 | 48 | 66 | 104 | 201 | 200 | 170 | 132 | 5 | 136 | 4 | 0 | -2 | -1 | -4 | -6 | -1 |
| 3 | 186 | 6 | 52 | 202 | 240 | 203 | 248 | 232 | 236 | 204 | 2 | -2 | -6 | -1 | 2 | -2 | -1 |
| 4 | 64 | 16 | 130 | 49 | 66 | 74 | 205 | 204 | 34 | 28 | 7 | -2 | -4 | 1 | 0 | 4 | 0 |
| 5 | 7 | 184 | 248 | 110 | 253 | 2 | 90 | 79 | 253 | 96 | 3 | 8 | 2 | -1 | -8 | -2 | -1 |
| 6 | 86 | 202 | 116 | 218 | 114 | 250 | 186 | 162 | 33 | 0 | 3 | 6 | -2 | -1 | -6 | 2 | -1 |
| 7 | 98 | 12 | 133 | 137 | 186 | 36 | 48 | 206 | 120 | 83 | 4 | 0 | 2 | -1 | 0 | -2 | -1 |
| 8 | 250 | 216 | 174 | 164 | 137 | 216 | 40 | 181 | 71 | 194 | 2 | -4 | -2 | -1 | 4 | 2 | -1 |
| 9 | 19 | 202 | | | | | | | | | | | | | | | |

| NUMBER OF VALID SUB-INFORMATION | NUMBER OF INVALID SUB-INFORMATION | | NUMBER OF VALID SUB-INFORMATION | NUMBER OF INVALID SUB-INFORMATION |
|---|---|---|---|---|
| 3 | 0 | | 2 | 1 |

FIG. 13

TABLE 2

| SECTION NO. | DS0 | DS1 | DS2 | DS3 | DS4 | DS5 | DS6 | DS7 | DS8 | DS9 | NUMBER OF VALID DATA | MODULATION OF PRESENT INVENTION | | INSERTED SUB-INFORMATION | NORMAL MODULATION | | DETECTED SUB-INFORMATION |
|---|---|---|---|---|---|---|---|---|---|---|---|---|---|---|---|---|---|
| | | | | | | | | | | | | DSV4 | DSV9 | | DSV4 | DSV9 | |
| 0 | SYNC | 22 | 214 | 247 | 115 | 0 | 134 | 17 | 206 | 26 | 5 | -6 | -10 | 1 | 4 | -4 | 1 |
| 1 | 95 | 127 | 81 | 20 | 128 | 185 | 22 | 80 | 230 | 189 | 4 | -4 | -2 | | -4 | -2 | -1 |
| 2 | 26 | 217 | 110 | 159 | 14 | 223 | 198 | 71 | 68 | 102 | 4 | 2 | -4 | -1 | 2 | -2 | -1 |
| 3 | 4 | 12 | 137 | 136 | 34 | 20 | 6 | 168 | 216 | 74 | 6 | 0 | -4 | 1 | 0 | -10 | 1 |
| 4 | 185 | 194 | 75 | 205 | 238 | 38 | 24 | 143 | 32 | 250 | 4 | 2 | 2 | -1 | -4 | -4 | -1 |
| 5 | 94 | 191 | 106 | 147 | 135 | 87 | 228 | 83 | 66 | 206 | 3 | -6 | -2 | -1 | 4 | 0 | -1 |
| 6 | 220 | 70 | 48 | 74 | 105 | 217 | 232 | 142 | 192 | 197 | 3 | 4 | 2 | -1 | -6 | -4 | -1 |
| 7 | 153 | 56 | 21 | 114 | 132 | 181 | 159 | 216 | 196 | 169 | 2 | -2 | 0 | -1 | 0 | -2 | -1 |
| 8 | 28 | 113 | 234 | 190 | 230 | 148 | 101 | 231 | 160 | 22 | 2 | 8 | 0 | -1 | -6 | 2 | -1 |
| 9 | 72 | 107 | | | | | | | | | | | | | | | |

| NUMBER OF VALID SUB-INFORMATION | NUMBER OF INVALID SUB-INFORMATION | NUMBER OF VALID SUB-INFORMATION | NUMBER OF INVALID SUB-INFORMATION |
|---|---|---|---|
| 2 | 0 | 2 | 0 |

FIG. 14

TABLE 3

| SECTION NO. | DS0 | DS1 | DS2 | DS3 | DS4 | DS5 | DS6 | DS7 | DS8 | DS9 | NUMBER OF VALID DATA | 4 OR MORE DSV4 | 4 OR MORE DSV9 | INSERTED SUB-INFORMATION | 5 OR MORE DSV4 | 5 OR MORE DSV9 | INSERTED SUB-INFORMATION |
|---|---|---|---|---|---|---|---|---|---|---|---|---|---|---|---|---|---|
| 0 | SYNC | 64 | 228 | 157 | 90 | 145 | 231 | 31 | 45 | 219 | 4 | -10 | -4 | 0 | 4 | 2 | -1 |
| 1 | 224 | 203 | 216 | 236 | 172 | 76 | 209 | 3 | 130 | 119 | 2 | -2 | -8 | -1 | 4 | -6 | -1 |
| 2 | 74 | 7 | 212 | 245 | 55 | 76 | 135 | 9 | 239 | 46 | 6 | 2 | 0 | 1 | 0 | 2 | 0 |
| 3 | 59 | 155 | 4 | 86 | 130 | 125 | 75 | 83 | 252 | 216 | 5 | -2 | -4 | 1 | 4 | 6 | 0 |
| 4 | 98 | 188 | 146 | 235 | 120 | 185 | 230 | 79 | 5 | 126 | 2 | 2 | 8 | -1 | 0 | 2 | -1 |
| 5 | 165 | 41 | 239 | 110 | 51 | 26 | 5 | 116 | 164 | 125 | 4 | 2 | 0 | 1 | 4 | 6 | -1 |
| 6 | 199 | 67 | 102 | 234 | 16 | 150 | 51 | 234 | 26 | 151 | 4 | 0 | 2 | 0 | 2 | 8 | -1 |
| 7 | 103 | 194 | 55 | 194 | 151 | 215 | 213 | 85 | 102 | 150 | 2 | 0 | 4 | -1 | 2 | 2 | -1 |
| 8 | 155 | 220 | 34 | 14 | 224 | 70 | 144 | 223 | 4 | 244 | 4 | 2 | 0 | 1 | 0 | -2 | -1 |
| 9 | 70 | 243 | | | | | | | | | | | | | | | |

| NUMBER OF VALID SUB-INFORMATION | 6 | NUMBER OF VALID SUB-INFORMATION | 2 |
|---|---|---|---|
| NUMBER OF INVALID SUB-INFORMATION | 0 | NUMBER OF INVALID SUB-INFORMATION | 0 |

FIG. 15

TABLE 4

| SECTION NO. | DS0 | DS1 | DS2 | DS3 | DS4 | DS5 | DS6 | DS7 | DS8 | DS9 | NUMBER OF VALID DATA | 4 OR MORE | | | 5 OR MORE | | |
|---|---|---|---|---|---|---|---|---|---|---|---|---|---|---|---|---|---|
| | | | | | | | | | | | | DSV4 | DSV9 | INSERTED SUB-INFORMATION | DSV4 | DSV9 | INSERTED SUB-INFORMATION |
| 0 | SYNC | 154 | 37 | 155 | 126 | 11 | 118 | 234 | 143 | 131 | 3 | 8 | 10 | -1 | 8 | 10 | -1 |
| 1 | 36 | 171 | 74 | 158 | 130 | 187 | 32 | 61 | 27 | 84 | 6 | -4 | 2 | 0 | -2 | -4 | 1 |
| 2 | 59 | 10 | 3 | 173 | 213 | 110 | 152 | 234 | 163 | 153 | 3 | 4 | 2 | -1 | -2 | -4 | -1 |
| 3 | 239 | 27 | 55 | 24 | 249 | 238 | 100 | 155 | 71 | 118 | 4 | 0 | 4 | 1⇨0 | 6 | 0 | -1 |
| 4 | 247 | 119 | 241 | 148 | 129 | 22 | 245 | 83 | 131 | 190 | 2 | -4 | 4 | -1 | -8 | 0 | -1 |
| 5 | 152 | 147 | 236 | 182 | 226 | 118 | 97 | 4 | 199 | 2 | 2 | 4 | -14 | -1 | -4 | -22 | -1 |
| 6 | 168 | 109 | 192 | 111 | 8 | 122 | 229 | 141 | 178 | 37 | 2 | -24 | -22 | -1 | -32 | -30 | -1 |
| 7 | 116 | 201 | 105 | 7 | 109 | 160 | 23 | 37 | 226 | 186 | 3 | -10 | -12 | -1 | -18 | -20 | -1 |
| 8 | 95 | 145 | 68 | 219 | 34 | 25 | 105 | 126 | 34 | 143 | 4 | -4 | 0 | 0 | -12 | -8 | -1 |
| 9 | 26 | 72 | | | | | | | | | | | | | | | |

| NUMBER OF VALID SUB-INFORMATION | 2 | NUMBER OF VALID SUB-INFORMATION | 1 |
|---|---|---|---|
| NUMBER OF INVALID SUB-INFORMATION | 1 | NUMBER OF INVALID SUB-INFORMATION | 0 |

FIG. 16

TABLE 5

| SECTION NO. | DS0 | DS1 | DS2 | DS3 | DS4 | DS5 | DS6 | DS7 | DS8 | DS9 | NUMBER OF VALID DATA | 4 OR MORE | | | 5 OR MORE | | |
|---|---|---|---|---|---|---|---|---|---|---|---|---|---|---|---|---|---|
| | | | | | | | | | | | | DSV4 | DSV9 | INSERTED SUB-INFORMATION | DSV4 | DSV9 | INSERTED SUB-INFORMATION |
| 0 | SYNC | 22 | 214 | 247 | 115 | 0 | 134 | 17 | 206 | 26 | 5 | -6 | -10 | 1 | -6 | -4 | -0 |
| 1 | 95 | 127 | 81 | 20 | 128 | 185 | 22 | 80 | 230 | 189 | 4 | -4 | -2 | 0 | -4 | -2 | -1 |
| 2 | 26 | 217 | 110 | 159 | 14 | 223 | 198 | 71 | 68 | 102 | 4 | -8 | -2 | 0 | 2 | -4 | -1 |
| 3 | 4 | 12 | 137 | 136 | 34 | 20 | 6 | 168 | 216 | 74 | 6 | 0 | -2 | 1 | -6 | -4 | 0 |
| 4 | 185 | 194 | 75 | 205 | 238 | 38 | 24 | 143 | 32 | 250 | 4 | -8 | 0 | 0 | -8 | 0 | -1 |
| 5 | 94 | 191 | 106 | 147 | 135 | 87 | 228 | 83 | 66 | 206 | 3 | 8 | 4 | -1 | 8 | 4 | -1 |
| 6 | 220 | 70 | 48 | 74 | 105 | 217 | 232 | 142 | 192 | 197 | 3 | -2 | -4 | -1 | -2 | -4 | -1 |
| 7 | 153 | 56 | 21 | 114 | 132 | 181 | 159 | 216 | 196 | 169 | 2 | -2 | 0 | -1 | -2 | 0 | -1 |
| 8 | 28 | 113 | 31 | 34 | 74 | 237 | 100 | 142 | 166 | 165 | 4 | -6 | -6 | 0⇔-2 | 0 | -10 | -1 |
| 9 | 212 | 150 | | | | | | | | | | | | | | | |

| | NUMBER OF VALID SUB-INFORMATION | NUMBER OF INVALID SUB-INFORMATION | | NUMBER OF VALID SUB-INFORMATION | NUMBER OF INVALID SUB-INFORMATION |
|---|---|---|---|---|---|
| | 5 | 1 | | 2 | 0 |

FIG. 17

TABLE 6

| SECTION NO. | DS0 | DS1 | DS2 | DS3 | DS4 | DS5 | DS6 | DS7 | DS8 | DS9 | NUMBER OF VALID DATA | DSV4 | DSV9 | 4 OR MORE | INSERTED SUB-INFORMATION |
|---|---|---|---|---|---|---|---|---|---|---|---|---|---|---|---|
| 0 | SYNC | 154 | 37 | 155 | 126 | 11 | 118 | 234 | 143 | 131 | 3 | 8 | 10 | | -1 |
| 1 | 36 | 171 | 74 | 158 | 130 | 187 | 32 | 61 | 27 | 84 | 6 | -4 | 2 | | 0 |
| 2 | 59 | 10 | 3 | 173 | 213 | 110 | 152 | 234 | 163 | 153 | 3 | 4 | 2 | | -1 |
| 3 | 239 | 27 | 55 | 24 | 249 | 238 | 100 | 155⇨0 | 71 | 118 | 4⇨5 | 4 | 0 | | 1 |
| 4 | 247 | 119 | 241 | 148 | 129 | 22 | 245 | 83 | 131 | 190 | 2 | 8 | 0 | | -1 |
| 5 | 152 | 147 | 236 | 182 | 226 | 118 | 97 | 4 | 199 | 2 | 2 | 4 | 22 | | -1 |
| 6 | 168 | 109 | 192 | 111 | 8 | 122 | 229 | 141 | 178 | 37 | 2 | 32 | 30 | | -1 |
| 7 | 116 | 201 | 105 | 7 | 109 | 160 | 23 | 37 | 226 | 186 | 3 | 18 | 20 | | -1 |
| 8 | 95 | 145 | 68 | 219 | 34 | 25 | 105 | 126 | 34 | 143 | 4 | 14 | 4 | | 1 |
| 9 | 26 | 72 | | | | | | | | | | | | | |

| NUMBER OF VALID SUB-INFORMATION | 3 |
|---|---|
| NUMBER OF INVALID SUB-INFORMATION | 0 |

FIG. 18

TABLE 7

| SECTION NO. | DS0 | DS1 | DS2 | DS3 | DS4 | DS5 | DS6 | DS7 | DS8 | DS9 | NUMBER OF VALID DATA | DSV4 | DSV9 | 4 OR MORE INSERTED SUB-INFORMATION |
|---|---|---|---|---|---|---|---|---|---|---|---|---|---|---|
| 0 | SYNC | 22 | 214 | 247 | 115 | 0 | 134 | 17 | 206 | 26 | 5 | -6 | -4 | 0 |
| 1 | 95 | 127 | 81 | 20 | 128 | 185 | 22 | 80 | 230 | 189 | 4 | -4 | -2 | 0 |
| 2 | 26 | 217 | 110 | 159 | 14 | 223 | 198 | 71 | 68 | 102 | 4 | 2 | -4 | 1 |
| 3 | 4 | 12 | 137 | 136 | 34 | 20 | 6 | 168 | 216 | 74 | 6 | -6 | -4 | 0 |
| 4 | 185 | 194 | 75 | 205 | 238 | 38 | 24 | 143 | 32 | 250 | 4 | -8 | 0 | 0 |
| 5 | 94 | 191 | 106 | 147 | 135 | 87 | 228 | 83 | 66 | 206 | 3 | 8 | 4 | -1 |
| 6 | 220 | 70 | 48 | 74 | 105 | 217 | 232 | 142 | 192 | 197 | 3 | -2 | -4 | -1 |
| 7 | 153 | 56 | 21 | 114 | 132 | 181 | 159 | 216 | 196 | 169 | 2 | -2 | 0 | -1 |
| 8 | 28 | 113 | 31 | 34 | 74 | 237 | 100 | 142 | 166 | 165⇨0 | 4⇨5 | 0 | -10 | 1 |
| 9 | 212 | 150 | | | | | | | | | | | | |

| | |
|---|---|
| NUMBER OF VALID SUB-INFORMATION | 6 |
| NUMBER OF INVALID SUB-INFORMATION | 0 |

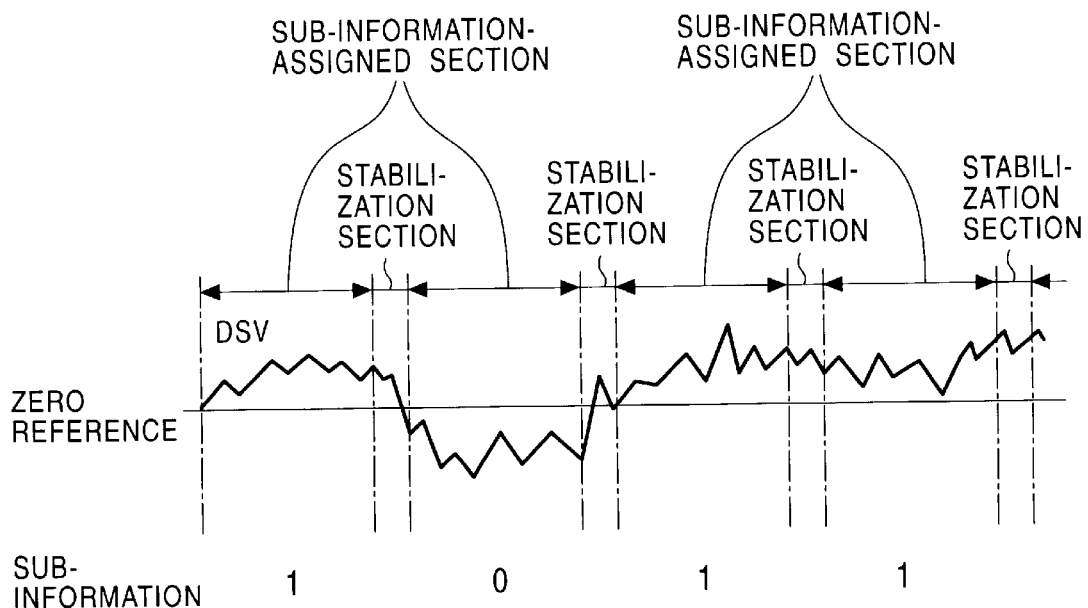
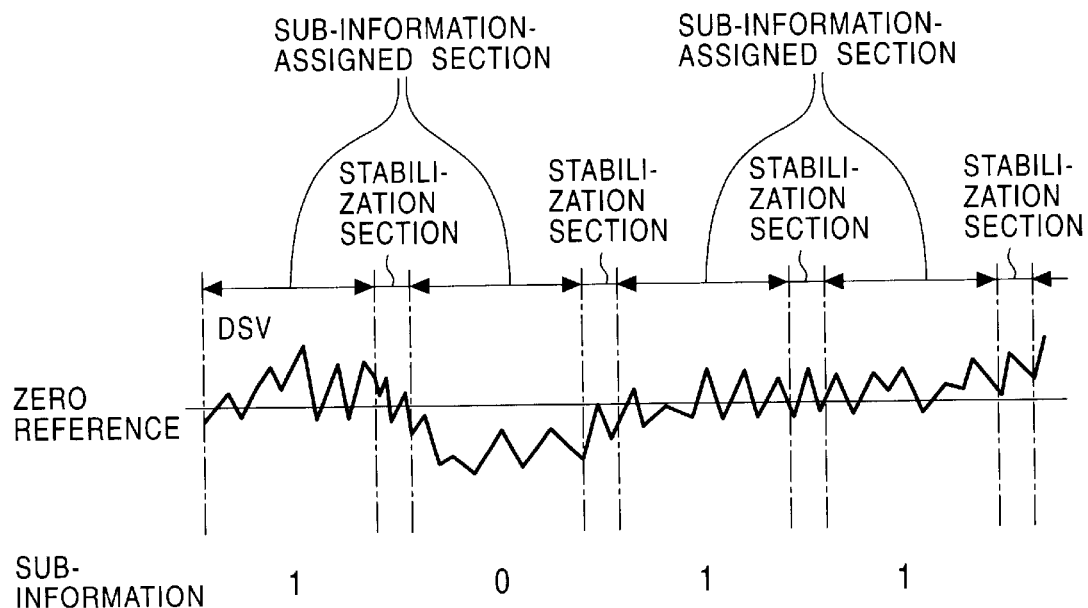

DIGITAL MODULATION METHOD, DIGITAL DEMODULATION METHOD, AND PRERECORDED RECORDING MEDIUM

BACKGROUND OF THE INVENTION

1. Field of the Invention

The present invention relates to digital modulation methods, digital demodulation methods, and prerecorded recording media which are suitable for use in, for example, digital versatile disks (hereinafter referred to as "DVDs"). More particularly, the present invention relates to a digital modulation method, a digital demodulation method, and a prerecorded recording medium capable of inserting arbitrary sub-information into serial data by controlling the conversion of actual-value digital data into serial data.

2. Description of the Related Art

For example, one type of apparatus for inserting arbitrary sub-information into serial data recorded in DVDs is described in U.S. Pat. No. 6,078,552 (Yamamoto et al.). According to this apparatus, arbitrary sub-information is inserted by modulating the light intensity of a laser beam when recording serial data on a DVD. When playing the DVD, the sub-information is extracted by detecting variations in the read levels of read signals.

The sub-information is used to prevent illegal disks created by copying and alteration, to determine whether or not playback is under copyright, and to determine whether or not copying is authorized/unauthorized. The above-described modulation of the light intensity of a laser beam, which is performed when recording data, is effective in optical recording media such as DVDs which employ light as read/write means. However, the modulation is ineffective for magnetic tapes and magnetic disks having recorded therein data created by copying or alteration.

When recording data on a CD-R (Compact Disk Recordable) or a CD-RW (Compact Disk Re-Writable), the above-described sub-information is recorded by a special mechanism for modulating the light intensity of a laser beam. It is thus difficult to perform the modulation method in consumer apparatuses. Specifically, it is impossible to achieve the foregoing modulation method for CD-Rs and the like. Therefore the modulation method is ineffective for recording data created by copying or alteration.

When recording digital data on a DVD, 8-bit digital data to be recorded (hereinafter "data-to-be-recorded" is referred to as "target data") is converted into 16-bit serial data using the EEMplus (8-to-16 modulation) system, and recording signals are created using the NRZI (non-return-to-zero-inverted) system. At the same time, a digital sum value (hereinafter referred to as a "DSV"), which indicates the difference between the time for which the formed recording signals are at the value "1" and the time for which the signals are at the value "0", is measured. The DSV can be obtained by linking "1" in the recording signals after the NRZI conversion to "+1" and "0" to "−1" and computing the sum of 1's (+1) and 0's (−1). When converting digital data into serial data, the serial data is selected so as to minimize the DSV.

Specifically, when the DSV is large, a signal component of the serial data leaks into a servo signal at a player side, and this results in servo instability. When the DSV is large in binarization of a read signal, the possibility of an error being caused in determining the slice level for the binarization is increased.

For 8-bit target digital data, 256 combinations are possible. For 16-bit data, 65536 combinations are possible. The EFMplus conversion is performed against a predetermined reference period T, and a row of bits for a period of 3T to 11T and 14T are used as serial data. A conversion table for converting 8-bit data into 16-bit data has states 1 to 4. On the basis of the states 1 to 4 and target digital data, serial data is generated.

For target digital data having the actual values "0" to "87", the states 1 to 4 each have a main table and a sub table. The tables are arbitrarily selected, and serial data is generated. For target digital data having the actual values "88" to "255", on condition that the state is either the state 1 or 4 and that a sequence of 0's satisfies a predetermined value, the following data replacement is performed. Specifically, in the state 1, serial data in the state 4 can be replaced; in the state 4, serial data in the state 1 can be replaced.

The DSV can be controlled by controlling selection of main tables and sub tables for target digital data having the actual values "0" to "87" and by controlling data replacement in the state 1 or 4 of the target digital data having the actual values "88" to "255". Generally, the DSV has been controlled so as to be minimized.

Specifically, when a DVD conversion table indicates that target digital data indicates "0→3→0", there are eight possible patterns of serial data which can be output, as shown in FIG. 24. Also, there are eight possible combinations of state transitions. Referring to FIG. 24, each piece of serial data is shown such that the upper table is a main table and the lower table is a sub table. FIG. 25 shows variations of the DSV in this case. The terms "main" and "sub" indicate the history of table selections.

As has been described above, the DSV varies in accordance with, for example, the selection of tables. For example, the possibility of the final value ranges from a value close to the initial value to a value far from the initial value. The route between the initial value and the final value varies in accordance with, for example, the selection of tables. The DSV can be modulated in accordance with arbitrary sub-information, and the sub-information for preventing illegal disks and determining whether or not playback or copying is authorized can be inserted.

The DSV cannot be controlled for the entire target digital data. The DSV can be reliably controlled for the actual values "0" to "87". It is not always possible to modulate the DSV in accordance with arbitrary sub-information. Since the DSV is arbitrarily changed for a signal which is not modulated in this manner, a signal similar to sub-information may be erroneously extracted from the signal, resulting in an incorrect determination or a malfunction.

A known method for modulating the light intensity of a laser beam is ineffective for recording media which do not use light. It is also difficult to provide a commercial recording apparatus with a function for modulating the light intensity of a laser beam. In a known system for modulating the DSV and inserting sub-information, satisfactory sub-information may not be inserted, and the possibility of malfunctioning cannot be eliminated.

SUMMARY OF THE INVENTION

In order to solve the foregoing problems, it is an object of the present invention to locally control a digital sum value (DSV) which indicates the difference between the time for which serial data signals are at the value "1" and the time for which the signals are at the value "0", and to insert arbitrary sub-information using a variation pattern of the DSV. By setting the format of the variation pattern of the DSV, satisfactory sub-information can be inserted. By detecting the format of the variation pattern, possible incorrect determinations and malfunctions can be eliminated.

According to an aspect of the present invention, a digital modulation method for converting actual-value digital data into serial data is provided. The digital modulation method includes the steps of locally controlling a digital sum value (DSV) which indicates a difference between the time for which serial data signals are at the value "1" and the time for which the signals are at the value "0"; and inserting arbitrary sub-information using a variation pattern of the DSV.

According to another aspect of the present invention, a digital demodulation method for demodulating serial data into actual-value digital data is provided. The digital demodulation method includes the steps of measuring a digital sum value (DSV) which indicates a difference between the time for which serial data signals are at the value "1" and the time for which the signals are at the value "0"; and extracting arbitrary sub-information by detecting the variation pattern of the DSV.

According to another aspect of the present invention, a prerecorded recording medium having recorded therein serial data which is converted from actual-value digital data is provided. A digital sum value (DSV) which indicates a difference between the time for which serial data signals are at the value "1" and the time for which the signals are at the value "0" is locally controlled. Using a variation pattern of the DSV, arbitrary sub-information is inserted and recorded.

BRIEF DESCRIPTION OF THE DRAWINGS

FIG. 11 is a table for illustrating the digital modulation method;

FIG. 12 is another table for illustrating the digital modulation method;

FIG. 13 is another table for illustrating the digital modulation method;

FIG. 14 is another table for illustrating the digital modulation method;

FIG. 15 is another table for illustrating the digital modulation method;

FIG. 16 is another table for illustrating the digital modulation method;

FIG. 17 is another table for illustrating the digital modulation method;

FIG. 18 is another table for illustrating the digital modulation method;

FIG. 22 illustrates another embodiment of a digital modulation method of the present invention;

FIG. 23 illustrates yet another embodiment of a digital modulation method of the present invention;

DESCRIPTION OF THE PREFERRED EMBODIMENTS

Figure 1:
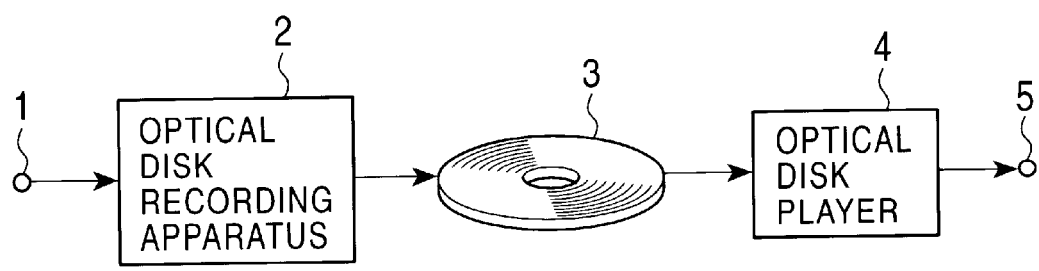
FIG. 1 illustrates the configuration of a system to which the present invention is applied.

The present invention will be described with reference to the accompanying drawings. FIG. 1 shows the configuration of a system to which a digital modulation method, a digital demodulation method, and a prerecorded recording medium of the present invention are applied. Referring to FIG. 1, content-to-be-recorded 1, which is digital data, is supplied to an optical disk recording apparatus 2, and the digital data is converted into serial data. Serial data signals are recorded on, for example, a DVD 3. The DVD 3 is played by an optical disk player 4, and signals demodulated into digital data are extracted as read content 5.

Figure 2:
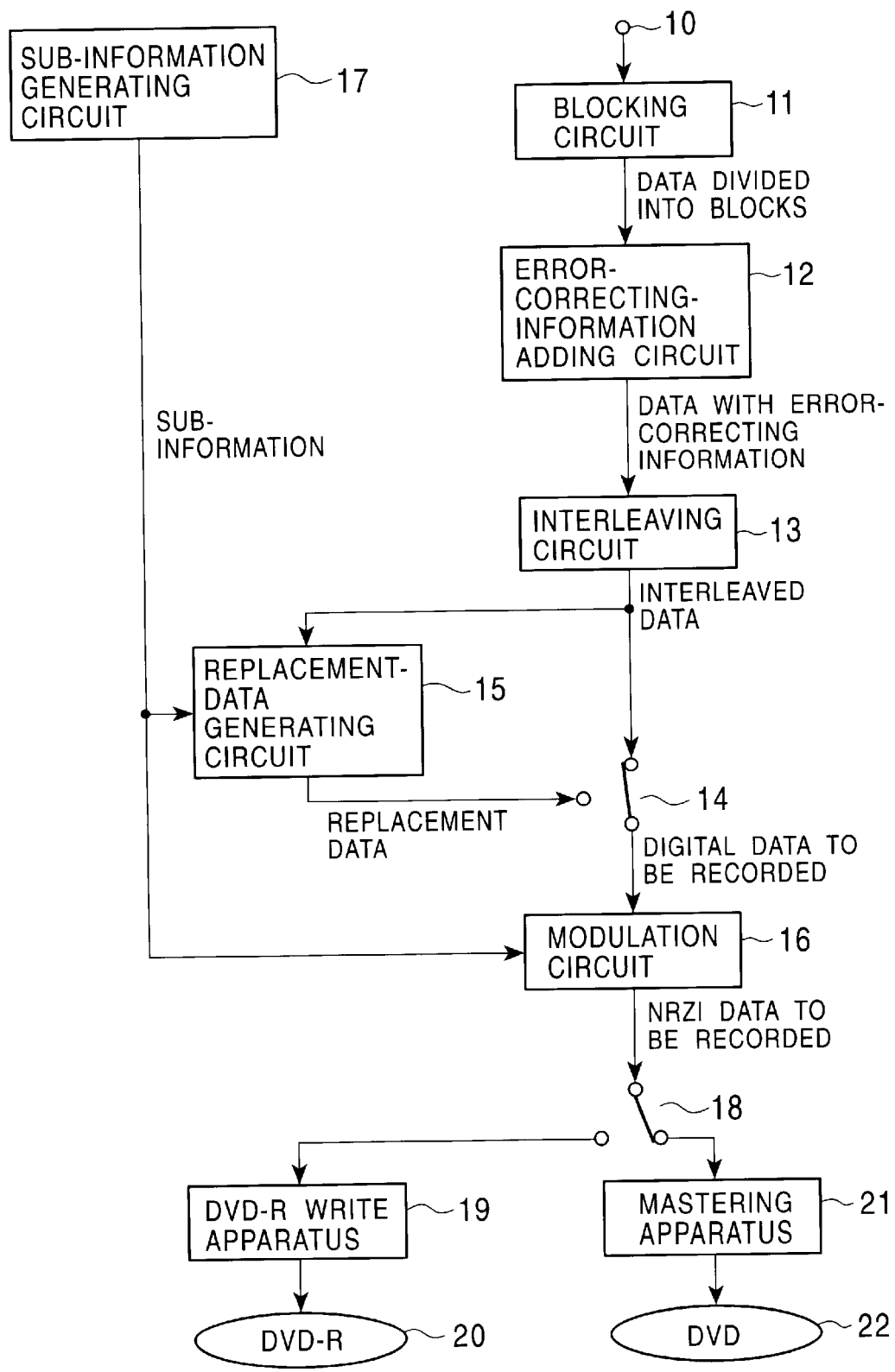
FIG. 2 is a block diagram of an embodiment of a recording apparatus to which a digital modulation method of the present invention is applied.
Figure 3:
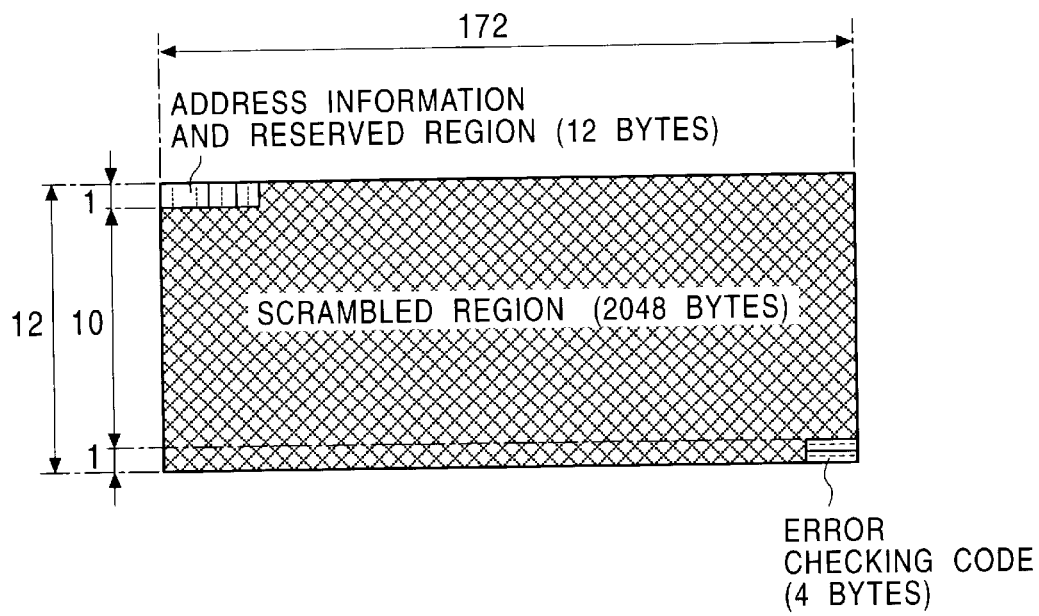
FIG. 3 illustrates a block of digital data.

FIG. 2 shows the structure of a recording apparatus to which the digital modulation method of the present invention is applied. Referring to FIG. 2, content-to-be-recorded 10 is supplied to a blocking circuit 11. Referring to FIG. 3, the blocking circuit 11 adds 12 bytes (or 12 pieces of data) of address information and the like to the head of 2048-byte digital data and 4 bytes (or 4 pieces of data) of error-checking code to the end of the 2048-byte digital data, scrambles the 2048-byte digital data, and divides the entire data into blocks, each block having 172×12 pieces of data.

Figure 4:
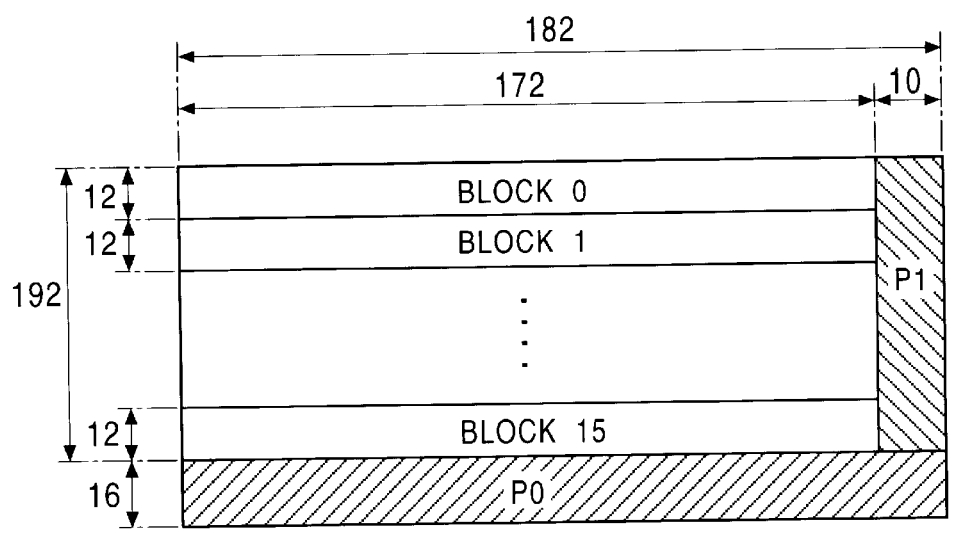
FIG. 4 illustrates blocks of digital data to which pieces of error-correcting information are added.

The digital data from the blocking circuit 11 is supplied to an error-correcting-information adding circuit 12. Referring to FIG. 4, the error-correcting-information adding circuit 12 adds 10-data horizontal error-correcting information (P1) and 16-data vertical error-correcting information (P0) to 16 blocks (172×19S2 data) of digital data. The horizontal error-correcting information (P1) is generated, and subsequently, the vertical error-correcting information (P0) is generated.

Figure 5:
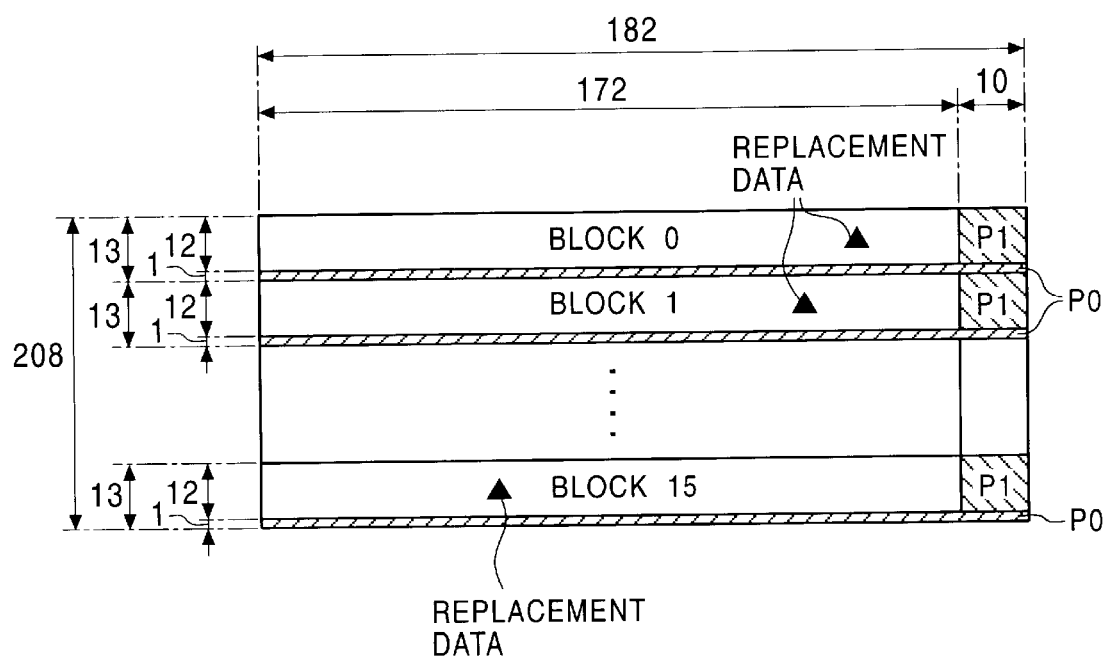
FIG. 5 illustrates interleaved digital data.

During playback, when one piece of error data occurs in each of the horizontal and vertical data rows, the positions of the error data are specified by the error-correcting information (P0 and P1), and the error data are corrected. The digital data with the error-correcting information is supplied to an interleaving circuit 13. Referring to FIG. 5, the digital data is rearranged so that the vertical error-correcting information (P0) is inserted into each block.

The digital data from the interleaving circuit 13 is supplied to a first fixed contact of a selector 14. The digital data from the interleaving circuit 13 is supplied to a replacement-data generating circuit 15 for replacing digital data under a specific condition. The replacement data from the replacement-data generating circuit 15 is supplied to a second fixed contact of the selector 14. The digital data selected by the selector 14 is supplied to a modulation circuit 16.

Figure 6:
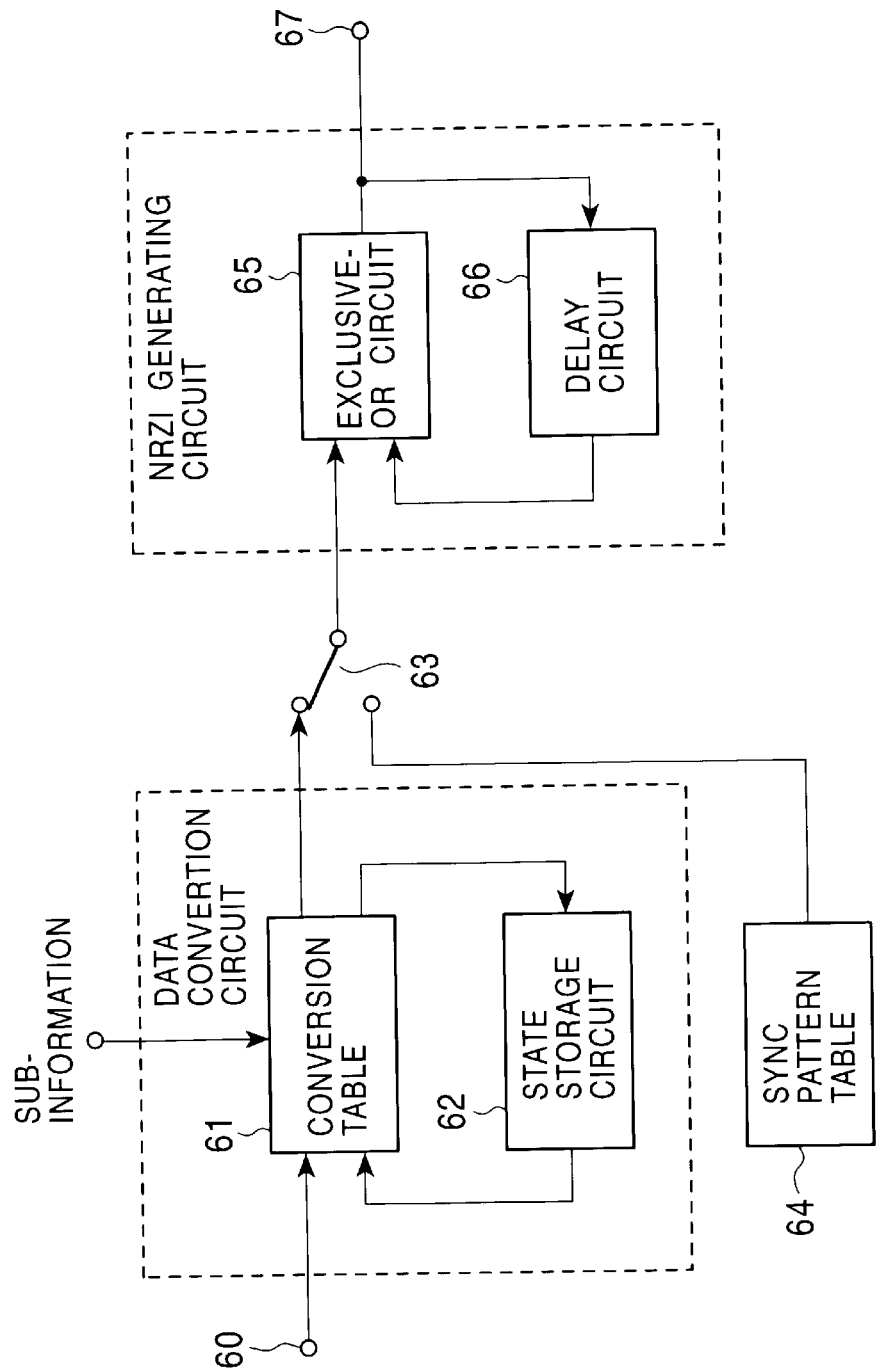
FIG. 6 is a block diagram of an embodiment of a modulation circuit.

In the modulation circuit 16, as shown in FIG. 6, digital data 60 is supplied from the selector 14 to a conversion table 61 forming a data conversion circuit. From the conversion table 61, serial data obtained by converting 8-bit data into 16-bit data and state values 1 to 4 are extracted. The state values 1 to 4 are supplied to a state storage circuit 62, and the state of the conversion table 61, which is to be selected when the next digital data 60 is supplied, is set.

The serial data generated by the conversion table 61 are supplied to a first fixed contact of a selector 63 and are switched to data for a sync pattern from a sync pattern table 64, which is supplied to a second fixed contact of the selector 63. A sync pattern has four states 1 to 4, and the states 1 to 4 each has a main table and a sub table. The tables are arbitrarily selected, and data for the sync pattern is generated.

Figure 7:
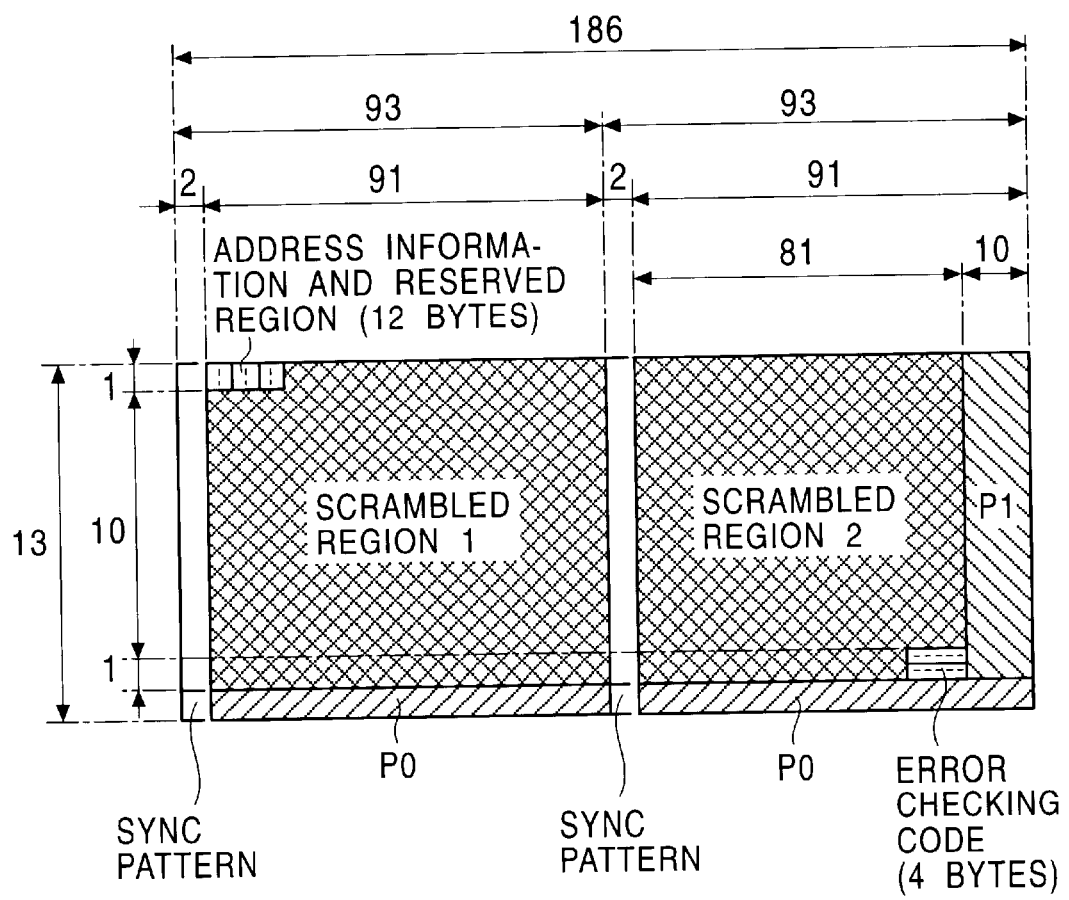
FIG. 7 illustrates serial data to which sync patterns are added.

Referring to FIG. 7, 182 pieces of data including 10-data horizontal error-correcting information is divided into two halves, each half having 91 pieces of data. A sync pattern, which has two pieces of data (32 bits), is added to the head of each half, and 93 pieces of serial data including the sync pattern are extracted from the selector 63. The serial data from the selector 63 are supplied to an exclusive-OR circuit 65 forming an NRZI generating circuit. The exclusive-OR output is fed back through a delay circuit 66, thereby generating NRZI-data-to-be-recorded 67.

Figure 8:
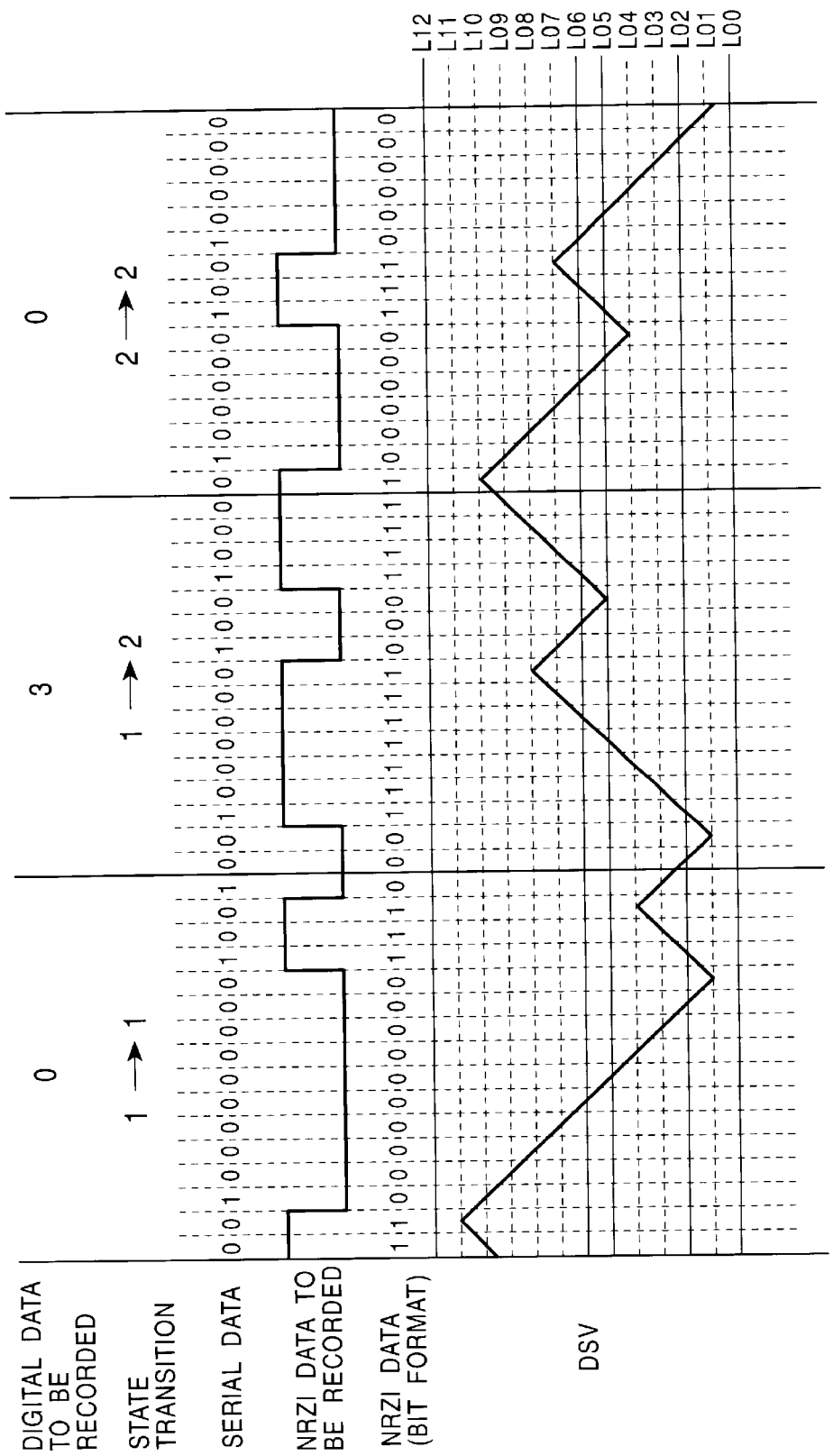
FIG. 8 illustrates the conversion of digital data into serial data, which in turn is converted into NRZI data.

Specifically, when target digital data indicates "0→3→0", the conversion table 61 converts the data into, for example, serial data "0010000000001001 . . . " shown in the third row in FIG. 8. The serial data is supplied to the NRZI generating circuit, and the NRZI-data-to-be-recorded 67 shown in the fourth row is generated. In the fifth row, the NRZI data is expressed as a bit-format value "1100000000001110 . . . ". A variation in the DSV based on the NRZI data is shown by a graph at the bottom.

Figure 24:
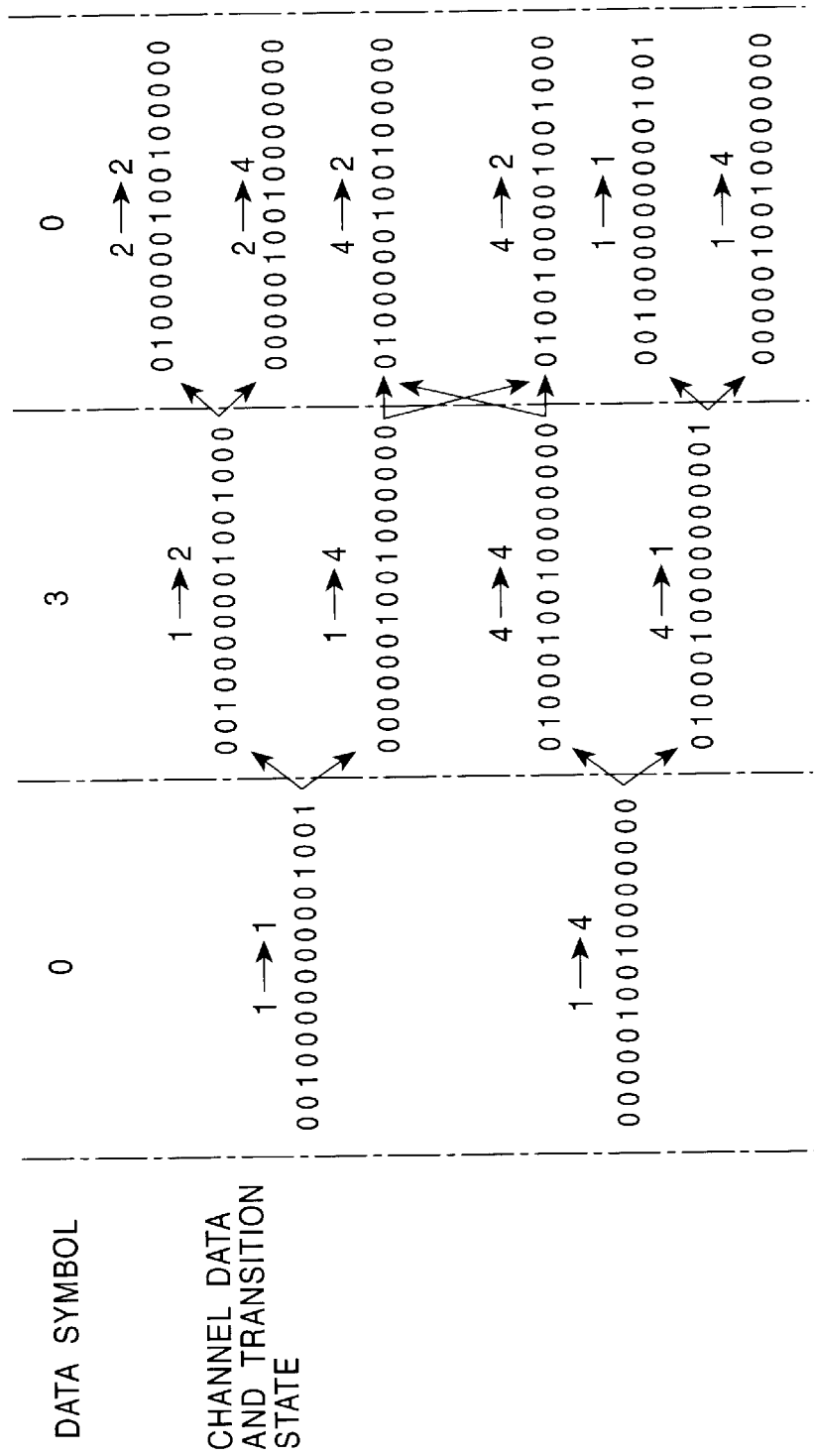
FIG. 24 illustrates an example of state transitions in converting serial data with a DVD conversion table.
Figure 25:
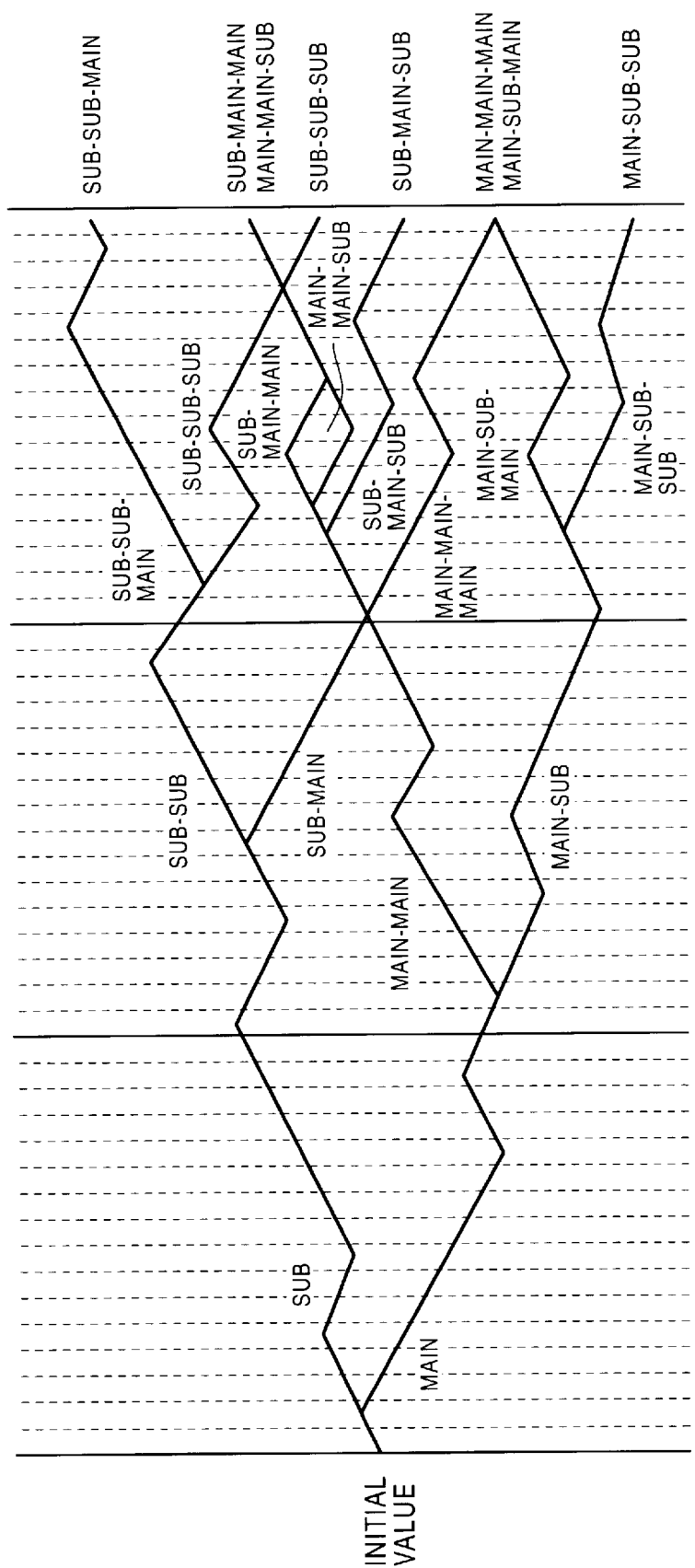
FIG. 25 illustrates an example of variations of a digital sum value (DSV) in converting as shown in FIG. 24.

As illustrated with reference to FIGS. 24 and 25, the DSV varies in accordance with conversion table selection. Hitherto, the conversion tables are selected so as to reduce the DSV. In contrast, the DSV is arbitrarily controlled in the present invention. At the same time, a predetermined format is used to control the DSV, thus satisfactory sub-information is inserted and possible incorrect determinations and malfunctions are eliminated.

Figure 9:
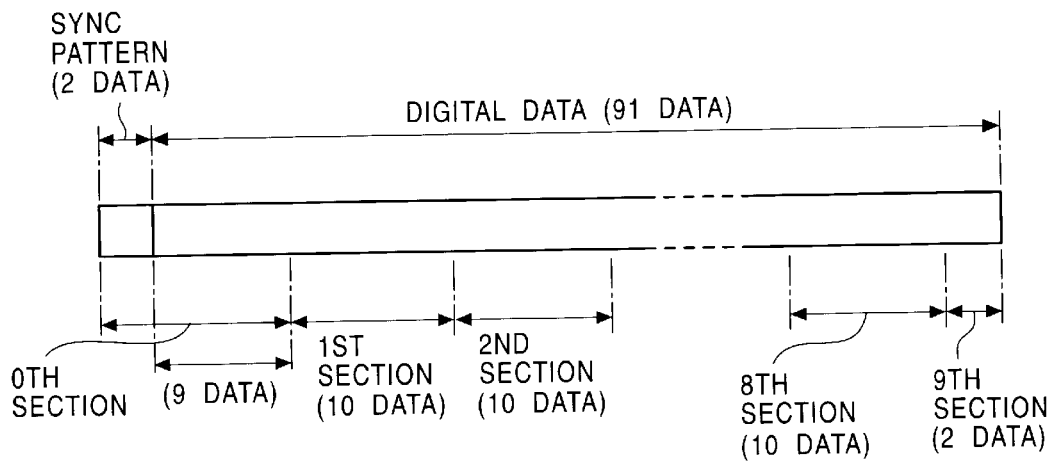
FIG. 9 illustrates an embodiment of the digital modulation method of the present invention.

In this embodiment of the present invention, as shown in FIG. 9, one sync frame includes serial data generated by adding the sync pattern data to the 91 pieces of data, generated by dividing the data into halves, as shown in FIG. 7. The sync pattern (32 bits) at the head and subsequent 9 pieces of data (9×16 bits) are regarded as a zeroth section. Subsequently, groups of ten pieces of data (10×16 bits) are regarded as first to eighth sections, respectively. The last two pieces of data (2×16 bits) are regarded as a ninth section. In this embodiment, the ninth section is not used.

Figure 10A:
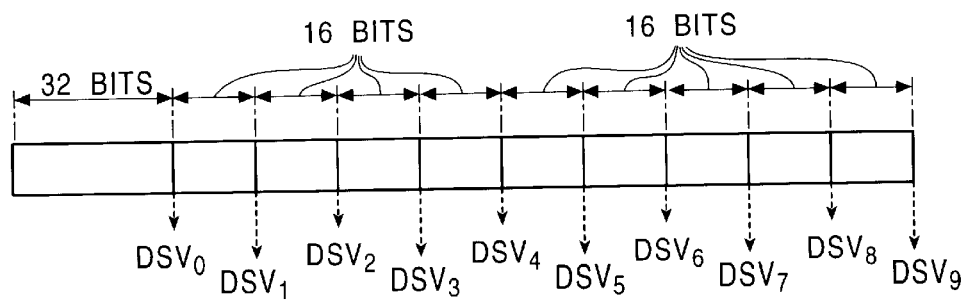
FIGS. 10A and 10B illustrate DSVs at the end of pieces of data.
Figure 10B:
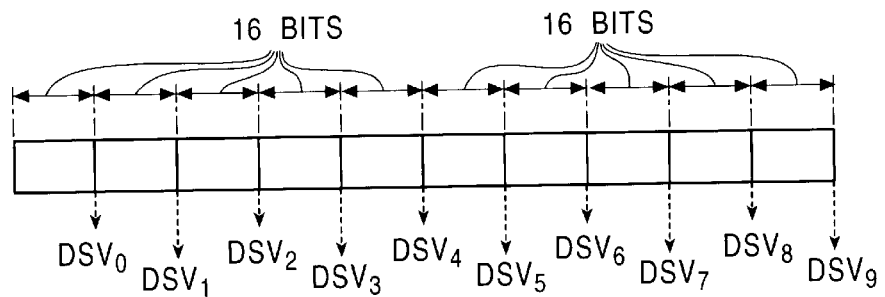

In the zeroth section, as shown in FIG. 10A, the DSV at the end of the sync pattern (32 bits) and the DSVs at the end of nine pieces of data (each includes 16 bits) are expressed by $DSV_0$ to $DSV_9$, respectively. In the first to eighth sections, as shown in FIG. 10B, the DSVs at the end of ten pieces of data are expressed by $DSV_0$ to $DSV_9$, respectively. Using $DSV_0$ to $DSV_9$, one-bit information is expressed when $DSV_0$ to $DSV_9$ correspond to a predetermined pattern.

Referring to FIG. 11, in a unit (hereinafter referred to as an ECC unit) including a set of 16 blocks of data and error-correcting information (hereinafter referred to as an ECC unit), 416 sync frames (0 to 415) are provided. Each sync frame has nine sections. Specifically, in one ECC unit, 416×9=3744 sections are provided. When $DSV_0$ to $DSV_9$ correspond to a predetermined pattern, one-bit sub-information can be expressed.

In this embodiment, for example, when the relationship between $DSV_4$ and $DSV_9$ is $DSV_4<DSV_9$, the sub-information indicating the value "0" is expressed. When $DSV_4>DSV_9$, the sub-information indicating the value "1" is expressed. In contrast, as described above, the DSV control can be effectively performed when target digital data have the actual values "0" to "87". In this embodiment, sub-information is only inserted into a section containing five or more pieces of the above-described valid target digital data.

Under these conditions, sub-information is inserted. A specific process of inserting sub-information will now be described. Described below is a case in which the foregoing sub-information is inserted in the first ECC unit of predetermined data which is commonly provided in the innermost circumference of a DVD video disk.

Referring to FIG. 12, Table 1 shows actual values of target digital data included in sections of the zeroth sync frame. The first target digital data in the zeroth section is a sync pattern (SYNC). In this case, the sync pattern is valid target digital data since the sync pattern has states 1 to 4 each including a main table and a sub table. In the zeroth sync frame, the zeroth, first, and fourth sections contain five or more pieces of valid target digital data. Thus, sub-information is inserted into these sections.

When $DSV_4$ and $DSV_9$ are controlled by selecting the main tables and the sub tables of the valid target digital data, the results are shown in the fifth and sixth columns from the right in Table 1. Sub-information to be inserted is shown in the fourth column from the right. In this case, the sub-information indicating the value "0" is inserted in the zeroth section; the sub-information indicating the value "0" is inserted in the first section; and the sub-information indicating the value "1" is inserted in the fourth section. In an invalid section containing four or fewer pieces of valid target digital data, the value "−1" is indicated.

In the second and third columns from the right in Table 1, $DSV_4$ and $DSV_9$ as a result of modulation by a normal method are shown. In this case, $DSV_4=DSV_9$ in the first section. This never occurs when the foregoing control is performed. When $DSV_4=DSV_9$ as in the first section, the sub-information value is changed to the value "−2", as shown in the first column from the right. By detecting the sub-information value, it is possible to determine whether or not the sub-information has been inserted.

Referring to FIG. 13, Table 2 shows actual values of target digital data included in sections in the first sync frame in the first ECC unit of the predetermined data. In the first sync frame, the first and third sections contain five or more pieces of valid target digital data, and hence sub-information is inserted in these sections. The tables are selected, and $DSV_4$ and $DSV_9$ are controlled. The results are shown in the fifth and sixth columns from the right in Table 2, and sub-information inserted is shown in the fourth column from the right.

In this case, the sub-information indicating the value "1" is inserted in the zeroth section, and the sub-information indicating the value "1" is inserted in the third section. In contrast, as a result of normal modulation $DSV_4$ and $DSV_9$ are shown in the second and third columns from the right in Table 2. Consequently, the sub-information values indicated in the first column from the right are the same in both cases, i.e., a case in which the control according to the present invention is performed and a case in which normal modulation is performed. Using a variation pattern of the DSV, arbitrary sub-information can be inserted.

Referring back to FIG. 2, in the recording apparatus to which the digital modulation method of the present invention is applied, a sub-information generating circuit 17 supplies signals to the modulation circuit 16. The modulation circuit 16 selects tables of valid target digital data in accordance with the supplied sub-information and controls $DSV_4$ and $DSV_9$. The control of $DSV_4$ and $DSV_9$ is performed so that the overall DSV is not excessively increased.

Digital data indicating the values "0" to "87" in sections in which the foregoing sub-information is not inserted and digital data which indicates the value "88" or greater and which is in state 1 or 4 are controlled so that $DSV_4$ and $DSV_9$ in sections in which the sub-information is inserted are not influenced and that the overall DSV is not excessively increased. Computation of $DSV_4$ and $DSV_9$ is performed by resetting the DSV to the value "0" immediately before the sync pattern and is performed independent of and in parallel with the overall DSV.

Signals from the modulation circuit 16 are supplied through a first fixed contact of a selector 18 to a DVD-R (DVD-Recordable) write apparatus 19, and a DVD-R 20 is thus written. Signals recorded on the DVD-R 20 are evaluated. When the evaluation is acknowledged, signals from the modulation circuit 16 are supplied through a second fixed contact of the selector 18 to a DVD mastering apparatus 21, and a DVD 22 is created.

Creation of the DVD 22 is performed by known technology, and a drawing thereof is omitted. Schematically, for example, an exposure laser is turned ON/OFF in accordance with the values "0" and "1" of the NRZI-data-to-be-recorded 67 which is supplied from the selector 18. A photosensitive-glass original disk is exposed to light by the laser to create a stamper. Mass production of DVD video disks is implemented by using the stamper to imprint the pattern into the DVDs.

In the digital modulation method of this embodiment, the DSV which indicates the difference between the time for which serial data signals are at the value "1" and the time for which the signals are at the value "0" is locally controlled, and arbitrary sub-information is inserted using a variation pattern of the DSV. By defining the format of the DSV variation pattern, satisfactory sub-information can be inserted. By detecting the format of the variation pattern, possible incorrect determinations and malfunctions can be eliminated.

A known system for modulating the light intensity of a laser beam and for inserting sub-information is ineffective for recording media which do not use light. It is difficult to provide a commercial recording apparatus with a function for modulating the light intensity of a laser beam. When a system for modulating the DSV and for inserting sub-information is simply implemented, satisfactory sub-information cannot be inserted, and the possibility of malfunctioning cannot be eliminated. According to the present invention, these problems can be easily solved.

For the foregoing predetermined data, measuring is performed in the ECC unit illustrated in Table 1 and Table 2. The number of valid sections into which sub-information can be inserted by the modulation method of this embodiment is 812. The number of invalid sections in which $DSV_4$ is equal to $DSV_9$ is 0. In contrast, in normal modulation, the number of sections in which results similar to sub-information occur is 700. The number of pieces of invalid sections in which $DSV_4$ is equal to $DSV_9$ is 112.

In other words, the number of invalid sections can be used to detect the presence of sub-information in this embodiment. An invalid section in which $DSV_4$ is equal to $DSV_9$ should not occur when sub-information is inserted according to this embodiment. An invalid section may result because of a signal error or the like. In contrast, in normal modulation, since the DSV is always controlled so as to be minimized, the possibility of $DSV_4$ becoming equal to $DSV_9$ is high, and it is likely that invalid sections are generated.

The number of valid sections included in an ECC unit of the above-described predetermined data is 812. Accordingly, 812-bit sub-information can be inserted. On the average, this is under-estimated as 800 bits. For example, the number of ECC units in a lead-in area of a DVD video disk is 672. In other words, it is possible to insert 800×672=537600 bits of sub-information in the lead-in area of the DVD video disk.

In a DVD video disk, the number of ECC units in an area for recording $7 \times 10^9$ bytes of content is 143432. When the radius of a lead-out area ranges from 58 mm to 59 mm, the number of ECC units in this area is 6015. For example, the number of ECC units per single layer DVD video disk is 150119 including the lead-in area, and the total of approximately $1.2 \times 10^8$ bits of sub-information can be inserted therein.

In many bits of sub-information, a portion of the sub-information can be used as a region for error-correcting information. In this region, error-correcting information can be generated for necessary information to improve the reliability of sub-information to be inserted. By providing such error-correcting information, when a result similar to sub-information happens to result because of a normal operation, the error correction is disabled, and extraction of information is prevented. As a result, the possibility of malfunctioning is eliminated.

In this embodiment, sub-information is inserted into a section containing five or more valid pieces of valid target digital data. Alternatively, sub-information can be inserted into a section containing four or more pieces of valid target digital data. As a result, the number of bits of sub-information to be inserted can be increased. Specifically, referring to FIG. 14, Table 3 shows actual values of target digital data included in sections of a 101st sync frame in the first ECC unit of the predetermined data. In the 101st sync frame, when the number of pieces of valid target digital data is five or more, the number of valid sections is two. When the number of pieces of valid target digital data is four or more, the number of valid sections is six.

Referring to FIG. 15, Table 4 shows actual values of target digital data in sections of a 102nd sync frame in the ECC unit. The number of valid sections containing five or more pieces of valid target digital data is one. When the number of valid pieces of target digital data is four or more, the number of valid sections is three. In the third section containing four pieces of valid target digital data, when an attempt is made to insert the sub-information indicating the value "1", it is impossible to achieve $DSV_4 > DSV_9$. When this is subjected to normal processing, it becomes $DSV_4 < DSV_9$, and the sub-information indicating the value "0" is inserted. In Table 4, this is expressed by "1→0". The number of pieces of invalid sub-information is 1, and the number of pieces of valid sub-information is 3−1=2.

Referring to FIG. 16, Table 5 shows actual values of target digital data included in sections of a 235th sync frame in the ECC unit. The number of valid sections containing five or more pieces of valid target digital data is two. When the number of pieces of valid target digital data is four or more, the number of valid sections is six. In the eighth section containing four pieces of valid target digital data, when an attempt is made to insert the sub-information indicating the value "0", it is impossible to achieve $DSV_4<DSV_9$. When this is subjected to normal processing, it becomes $DSV_4=DSV_9$, and the sub-information cannot be inserted. In Table 5, this is indicated by "0→−2". The number of pieces of invalid sub-information is 1, and the number of pieces of valid sub-information is 6−1=5.

In such a section, for example, in the embodiment of the recording apparatus shown in FIG. 2 to which the digital modulation method according to the present invention is applied, signals from the sub-information generating circuit 17 are supplied to the replacement-data generating circuit 15. One piece among pieces of target digital data having the actual value "88" or greater included in the section is changed to the data for the actual values "0" to "87". Accordingly, the number of pieces of valid target digital data in the section becomes five, and hence effective modulation can be performed.

Specifically, in the third section of the 102nd sync frame, as shown by Table 6 in FIG. 17, the eighth target digital data (DS7) is changed from the actual value "155" to the actual value "0". Thus, when inserting the sub-information indicating the value "1", it is possible to achieve $DSV_4>DSV_9$. The digital data to be changed can be other target digital data such as DS0, DS4, DS5, DS6, or DS9. The digital data can be changed to any actual value ranging from "0" to "87".

In the eighth section of the 235th sync frame, as shown by Table 7 in FIG. 18, the tenth target digital data (DS9) is changed from the actual value "165" to the actual value "0". Thus, when inserting the sub-information indicating the value "0", it is possible to achieve $DSV_4<DSV_9$. The digital data to be changed can be other target digital data such as DS1, DS5, DS6, DS7, or DS8. The digital data can be changed to any actual value ranging from "0" to "87".

Accordingly, sub-information can be inserted into sections containing four or more pieces of valid target digital data. The replaced target digital data can be specified by the error-correcting information (P0 and P1), and data errors can be corrected. As shown in FIG. 5, the target digital data to be changed are arranged so that they are not aligned vertically and horizontally in the ECC unit.

When inserting sub-information in a section containing four or more pieces of valid target digital data, the number of valid sections included in the ECC unit of the predetermined data is 1109. Accordingly, 1109 bits of sub-information can be inserted. On the average, 1000-bit sub-information is inserted in each ECC unit. The total amount of sub-information per single layer DVD video disk is approximately $1.5 \times 10^8$ bits.

In many bits of sub-information, a portion of the sub-information can be used as a region for error-correcting information. In this region, error-correcting information generated for necessary information can be provided to improve the reliability of sub-information to be inserted. By providing such error-correcting information, when a result similar to sub-information happens to result because of a normal modulation, the error correction is disabled, and extraction of the information is prevented. As a result, the possibility of malfunctioning is eliminated.

Figure 19:
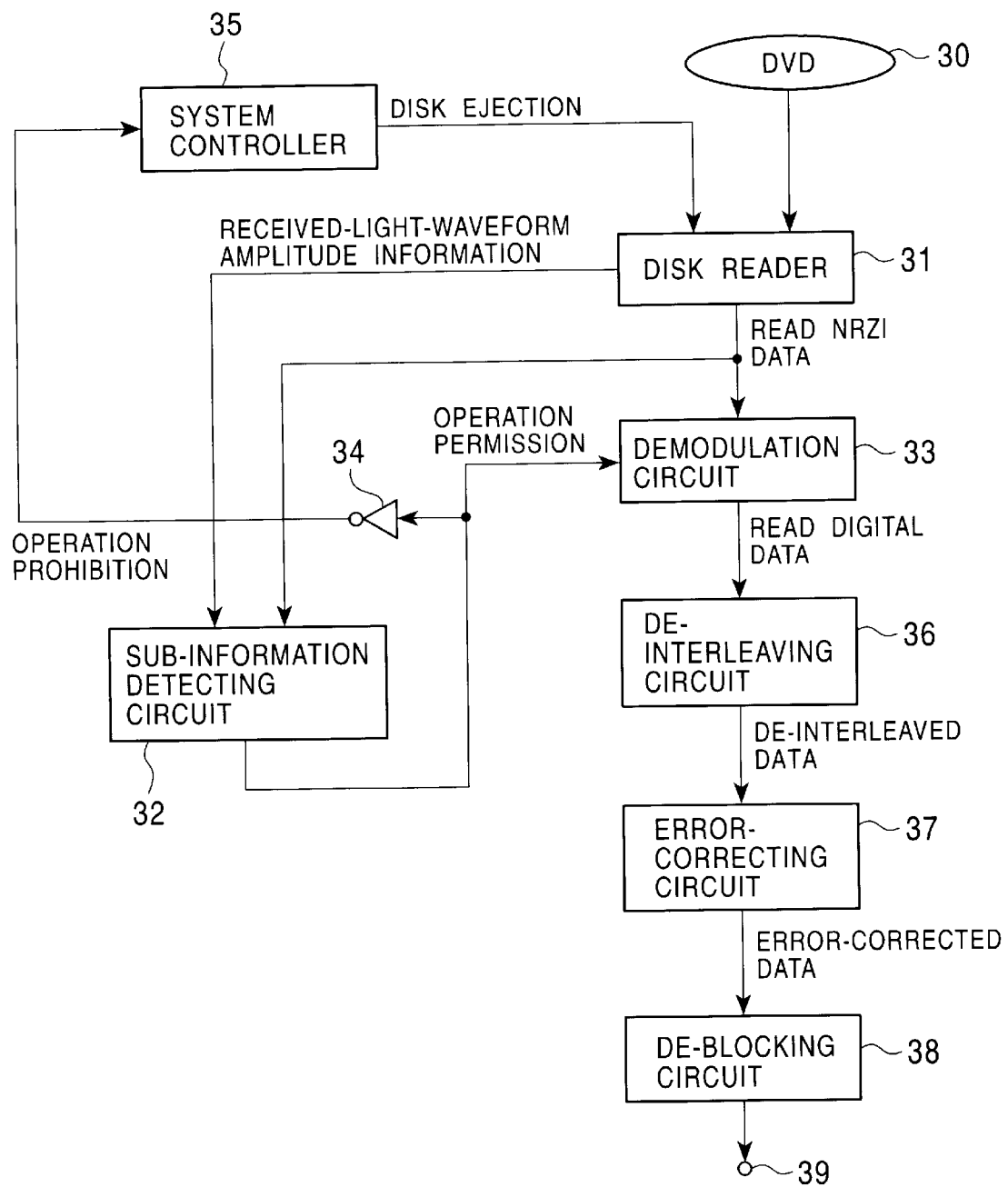
FIG. 19 is a block diagram of an embodiment of a player to which a digital demodulation method of the present invention is applied.
Figure 20:
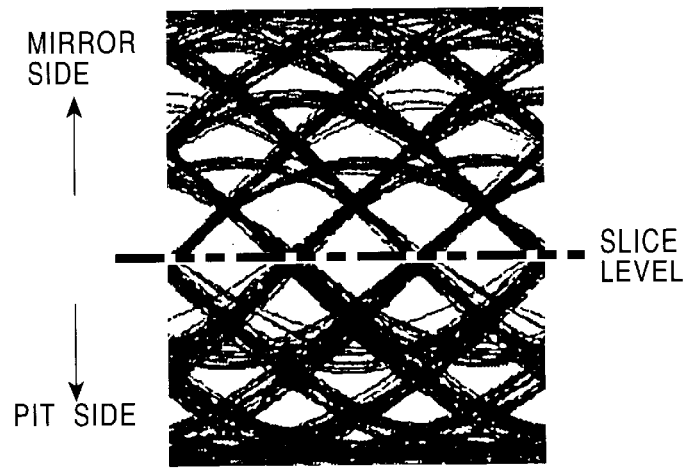
FIG. 20 illustrates the waveform of the returning light.

FIG. 19 shows an embodiment of a player to which a digital demodulation method of the present invention is applied. Referring to FIG. 19, signals recorded on a DVD 30 are read by a disk reader 31. In the disk reader 31, the DVD 30 is irradiated with a laser beam, and the returning light is received. The returning light has a waveform as shown in FIG. 20. The waveform is binarized at a predetermined slice level, and read NRZI data is extracted.

The read NRZI data is supplied to a sub-information detecting circuit 32. The sub-information detecting circuit 32 detects a sync pattern (SYNC) at the head of a sync frame, and subsequently converts each piece of target digital data into an actual value. Of the target digital data in the sections, the number of pieces of data indicating the actual values "0" to "87" is counted, and a section in which the counted number is four/five or greater is regarded as a valid section. In an invalid section, a detection value of sub-information is set to "−1".

At the same time, the DSV which is reset to "0" immediately before the sync pattern (SYNC) is computed. In each section, the DSVs ($DSV_0$ to $DSV_9$) at the end of the sync pattern and at the end of target digital data are measured. Of the $DSV_0$ to $DSV_9$, the relationship between $DSV_4$ and $DSV_9$ is detected. When $DSV_4<DSV_9$, the sub-information indicates the value "0". When $DSV_4>DSV_9$, the sub-information indicates the value "1". Accordingly, the sub-information is extracted.

Figure 21:
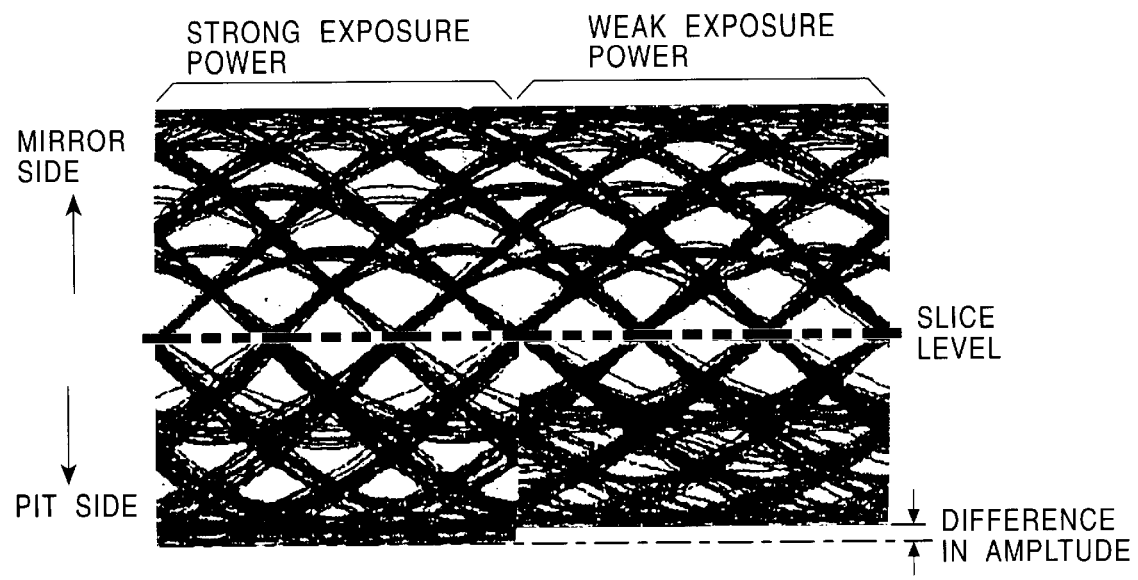
FIG. 21 illustrates the waveform of the returning light in which a variation in amplitude is detected.

When technology described in U.S. Pat. No. 6,078,552 (Yamamoto et al.) is used for the DVD 30, as shown in FIG. 21, a variations in amplitude is detected in the waveform of the returning light. Amplitude information of the waveform of the received-light which is extracted by the disk reader 31 is supplied to the sub-information detecting circuit 32. In this way, the sub-information can be extracted. Using the sub-information, the system can be controlled. Also, the information can be used for other arbitrary purposes.

The sub-information is used to prevent illegal disks created by copying and alteration, to determine whether or not playback is under copyright, and to determine whether or not copying is authorized. Using the sub-information extracted by the sub-information detecting circuit 32, whether or not playback is permitted is determined. When playback is permitted, an operation-permitted signal is supplied to a demodulation circuit 33 to which the read NRZI data is supplied from the disk reader 31, and demodulation is performed.

When playback is prohibited, the operation-permitted signal from the sub-information detecting circuit 32 is inverted, and demodulation by the demodulation circuit 33 is prohibited. At the same time, the operation-permitted signal is inverted by an inverter 34 to form an operation-prohibited signal. The operation-prohibited signal is supplied to, for example, a system controller 35. When an illegal disk is played, a command instructing the disk reader 31 to forcedly eject the illegal disk is output.

When playback is permitted, as shown in FIG. 5, the demodulation circuit 33 demodulates the data and generates read digital data. The read digital data is supplied to a de-interleaving circuit 36. As shown in FIG. 4, the de-interleaving circuit 36 generates de-interleaved data with the horizontal and vertical error-correcting information (P0 and P1). The de-interleaved data is supplied to an error-correcting circuit 37. The error-correcting circuit 37 generates error-corrected data, as shown in FIG. 3.

The error-corrected data is supplied to a de-blocking circuit 38, and read content 39 is extracted. Accordingly, the signals recorded on the DVD 30 are read. In this case, the DSV at the end of each piece of target digital data in each section is measured ($DSV_0$ to $DSV_9$). The relationship between $DSV_4$ and $DSV_9$ is detected, and sub-information is extracted. Using the sub-information, the system can be controlled. Also, the sub-information can be used for other arbitrary purposes.

In this embodiment of the digital demodulation method, arbitrary sub-information is extracted, using the DSV variation pattern, from serial data in which the DSV which indicates the difference between the time for which the signals are at the value "1" and the time for which the signals are at the value "0" is locally controlled. By setting the format of the DSV variation pattern, satisfactory sub-information can be inserted. By detecting the format of the variation pattern, possible incorrect determinations and malfunctions can be eliminated.

A known system for modulating the light intensity of a laser beam and for inserting sub-information is ineffective for recording media which do not use light. It is difficult to provide a commercial recording apparatus with a function for modulating the light intensity of a laser beam. When a system for modulating the DSV and for inserting sub-information is simply implemented, satisfactory sub-information cannot be inserted, and the possibility of malfunctioning cannot be eliminated. According to the present invention, these problems can be easily solved.

An embodiment of a prerecorded recording medium to which the present invention is applied can be created by the recording apparatus shown in FIG. 2. In other words, the DVD 22 and the DVD-R 20 created by the recording apparatus shown in FIG. 2 are prerecorded recording media to which the present invention is applied. In the DVD 22, which is the prerecorded recording medium of the present invention, the DSV which indicates the difference between the time for which converted signals are at the value "1" and the time for which the signals are at the value "0" is locally controlled. Serial data in which arbitrary sub-information is inserted on the basis of a variation pattern of the DSV is recorded.

The foregoing prerecorded recording medium of the present invention is not limited to a DVD and is applicable to a CD (Compact Disk), a CD-R (CD-Recordable), a CD-RW (CD-ReWritable), an MO (Magneto-Optical disk), an MD (Mini Disk), a DVD-RW (DVD-ReWritable), a DVD-RAM (DVD-Random Access Memory), and the like. In addition, the foregoing prerecorded recording medium of the present invention can be applied to a recording medium which does not use light, such as a magnetic disk, a magnetic tape, a semiconductor memory, and the like. In other words, the DSV is a concept specific to optical disks. When using the concept as a modulation method, the concept can be applied to all the recording media.

In the prerecorded recording medium of this embodiment, the DSV which indicates the difference between the time for which serial data signals are at the value "1" and the time for which the signals are at the value "0" is locally controlled, and arbitrary sub-information is inserted using a variation pattern of the DSV. By defining the format of the DSV variation pattern, satisfactory sub-information can be inserted. By detecting the format of the variation pattern, possible incorrect determinations and malfunctions can be eliminated.

A known system for modulating the light intensity of a laser beam and for inserting sub-information is ineffective for recording media which do not use light. It is difficult to provide a commercial recording apparatus with a function for modulating the light intensity of a laser beam. When a system for modulating the DSV and for inserting sub-information is simply implemented, satisfactory sub-information cannot be inserted, and the possibility of malfunctioning cannot be eliminated. According to the present invention, these problems can be easily solved.

In this case, according to the above-described embodiments, modulation for inserting sub-information is performed on the basis of NRZI data, and digital data is not influenced at all except for a case in which data replacement is performed. It is thus impossible to generate such sub-information by manipulating the digital data. Accordingly, such sub-information is suitable for use in preventing illegal disks created by copying and alteration, determining whether or not playback is permitted under copyright, and determining whether or not copying is authorized.

The digital modulation method and the digital demodulation method according to the present invention can be applied to broadcasting and communication means without using a recording medium. In broadcasting and communication, sub-information can be inserted into a broadcast signal and a communication signal by the foregoing modulation method. Using the sub-information, for example, illegal viewing and listening in pay broadcasting can be prevented. It is also possible to determine whether or not recording is authorized under copyright.

In the foregoing embodiments, particularly when applying the foregoing embodiments to the recording apparatus, it is necessary to prefetch a large amount of data when replacing data. Thus, the circuit configuration becomes large. Because such a recording apparatus is applied to a DVD mastering apparatus and not applied to a consumer apparatus, there are no problems. By controlling the location of such a mastering apparatus, creation of illegal disks can be effectively prevented.

When the foregoing embodiments become applicable to a consumer apparatus due to the circuit integration or the like, the foregoing embodiments can be used to achieve a serial copy management function. Specifically, information on the number of copies made is included in sub-information. When a copy is made, the number of copies is increased by one and is rewritten. In this way, the number of copies made can be detected. Accordingly, it is possible to determine whether or not the number of copies made is equal to or greater than a predetermined number and to restrict copying.

In the foregoing embodiments, for example, sub-information is inserted on the basis of $DSV_4$ and $DSV_9$ among DSVs at the end of data in sections obtained by dividing each sync frame. Alternatively, sub-information can be inserted on the basis of a variation of DSVs.

Specifically, referring to FIG. 22, serial data is divided into sub-information-assigned sections and stabilization sections. Each sub-information-assigned section has an arbitrary length, and each stabilization section has an arbitrary length. The stabilization section is controlled so that the DSV thereof becomes close to the value "0", and the sub-information-assigned section is controlled so that the DSV thereof becomes the value "0" or greater or becomes the value "0" or smaller. Accordingly, sub-information indicating the value "1" or "0" can be inserted using the DSV. In this case, when demodulating data, the sub-information can be extracted by directly detecting the DSV.

Referring to FIG. 23, only when sub-information to be inserted indicates the value "0", the DSV is controlled so as to draw away from the value "0" or to become the value "0" or smaller. When the sub-information indicates the value "1", the DSV is controlled so as to repetitively cross the value "0" in the vicinity of the value "0". Accordingly, the sub-information indicating the value "1" or "0" can be inserted. In this case, when demodulating data, the sub-information can be extracted by directly detecting the DSV.

According to the digital modulation method for converting actual-value digital data into serial data, the DSV which indicates the difference between the time for which serial data signals are at the value "1" and the time for which the signals are at "0" is locally controlled, and arbitrary sub-information is inserted using a variation pattern of the DSV. By setting the format of the DSV variation pattern, satisfactory sub-information can be inserted. By detecting the format of the variation pattern, possible incorrect determinations and malfunctions can be eliminated.

According to the digital demodulation method for converting serial data into actual-value digital data, the DSV which indicates the difference between the time for which serial data signals are at the value "1" and the time for which the signals are at the value "0" is measured, and arbitrary sub-information is extracted by detecting a variation pattern of the DSV. By setting the format of the DSV variation pattern, satisfactory sub-information can be inserted. By detecting the format of the variation pattern, possible incorrect determinations and malfunctions can be eliminated.

According to the prerecorded recording medium having recorded thereon serial data converted from actual-value digital data, the DSV which indicates the difference between the time for which serial data signals are at the value "1" and the time for which the signals are at the value "0" is locally controlled, and arbitrary sub-information is inserted and recorded using a variation pattern of the DSV. By setting the format of the DSV variation pattern, satisfactory sub-information can be inserted. By detecting the format of the variation pattern, possible incorrect determinations and malfunctions can be eliminated.

It is to be understood that the present invention is not limited to the above-described embodiments and is intended to cover various modifications included within the spirit and scope thereof.

What is claimed is:

1. A digital modulation method for converting actual-value digital data into serial data, comprising the steps of:

locally controlling a digital sum value (DSV) which indicates a difference between the time for which serial data signals are at the value "1" and the time for which the signals are at the value "0"; and inserting arbitrary sub-information using a variation pattern of the DSV.

2. A digital modulation method according to claim 1, further comprising the steps of:

dividing the digital data into sections each having a predetermined number of pieces of data;

extracting digital data in which the DSV is controllable when converting the digital data included in each of the sections into serial data; and inserting the arbitrary sub-information using a section containing a predetermined number of pieces of the extracted digital data or more.

3. A digital modulation method according to claim 2, wherein, in the section containing the predetermined number of pieces of the extracted digital data or more, the DSV at a predetermined position in the section is controlled when converting the extracted digital data into serial data, and the variation pattern of the DSV at the predetermined position is controlled in accordance with the arbitrary sub-information.

4. A digital demodulation method for converting serial data into actual-value digital data, comprising the steps of:

measuring a digital sum value (DSV) which indicates a difference between the time for which serial data signals are at the value "1" and the time for which the signals are at the value "0"; and determining a variation pattern of the DSV and extracting arbitrary sub-information.

5. A digital demodulation method according to claim 4, further comprising the steps of:

dividing the serial data into sections each having a predetermined number of bits; and detecting the variation pattern of the DSV at a predetermined position in each of the sections and extracting the arbitrary sub-information.

6. A digital demodulation method according to claim 5, wherein a section in which the DSV at the predetermined position corresponds to a specific pattern is detected, and the presence of the arbitrary sub-information is detected in accordance with the number of sections in which the DSV corresponds to the specific pattern.

7. A prerecorded recording medium having recorded therein serial data converted from actual-value digital data, wherein a digital sum value (DSV) which indicates a difference between the time for which serial data signals are at the value "1" and the time for which the signals are at the value "0" is locally controlled, and arbitrary sub-information is inserted and recorded using a variation pattern of the DSV.

8. A prerecorded recording medium according to claim 7, wherein the digital data is divided into sections each having a predetermined number of pieces of data, when converting the digital data contained in each of the sections into serial data, the digital data in which the DSV is controllable is extracted, and the arbitrary sub-information is inserted and recorded using a section containing a predetermined number of pieces of the extracted digital data or more.

9. A prerecorded recording medium according to claim 8, wherein, in the section containing the predetermined number of pieces of the extracted digital data or more, the DSV at a predetermined position in the section is controlled when converting the extracted digital data into serial data, and the variation pattern of the DSV at the predetermined position is controlled and recorded in accordance with the arbitrary sub-information.

* * * * *